United States Patent [19]

Razdow

[11] Patent Number: 5,526,475
[45] Date of Patent: Jun. 11, 1996

[54] METHOD FOR LIVE SYMBOLIC CALCULATIONS IN A MATHEMATICAL DOCUMENT EDITOR

[75] Inventor: Allen M. Razdow, Cambridge, Mass.

[73] Assignee: Mathsoft, Inc., Cambridge, Mass.

[21] Appl. No.: 204,841

[22] Filed: Mar. 2, 1994

[51] Int. Cl.$^6$ .................................................. G06F 17/10
[52] U.S. Cl. .................... 395/746; 364/715.01; 364/732; 364/733; 364/736
[58] Field of Search ................................. 395/145, 146; 364/200 MS File, 709 MS, 710 MS, 712 MS

[56] References Cited

U.S. PATENT DOCUMENTS

| | | | |
|---|---|---|---|
| 4,386,412 | 5/1983 | Ito | 364/710.14 |
| 4,811,257 | 3/1989 | Sumitani et al. | 364/709.01 |
| 4,845,652 | 7/1989 | Bunsen | 364/709.14 |
| 4,852,057 | 7/1989 | Patton | 364/709.06 |
| 4,893,234 | 1/1990 | Davidson | 364/200 |
| 4,972,334 | 11/1990 | Yamabe et al. | 395/500 |
| 5,067,102 | 11/1991 | Eisenstein | 364/709.12 |
| 5,127,104 | 6/1992 | Dennis | 395/650 |
| 5,175,700 | 12/1992 | Vogel et al. | 364/710.11 |
| 5,189,633 | 2/1993 | Bonadio | 364/709.12 |
| 5,195,172 | 3/1993 | Elad et al. | 395/50 |
| 5,233,685 | 8/1993 | Landes et al. | 395/147 |
| 5,251,292 | 10/1993 | Martel, Jr. et al. | 395/150 |
| 5,265,242 | 11/1993 | Fujisawa et al. | 395/600 |
| 5,285,400 | 9/1994 | Stent et al. | 364/709.14 |

OTHER PUBLICATIONS

M. Levine et al., "On Beyond Spreadsheets," *MacUser*, Nov. 1990, vol. 6, No. 11, p. 148 (12).

B. Simon, "It's Not Just for Mainframes Anymore: Symbolic Math Software," *PC Magazine*, Aug. 1992, vol. 11, No.14, p. 405(16).

R. Knaus, "Symbolic Simplification," *AI Expert*, Jun. 1991, vol. 6, No. 6, p. 21 (4).

"Mathcad 3.1 User's Guide Windows Version", Mathsoft, Inc., Cambridge, MA.

Mathcad User's Guide, Windows Version; MathSoft, Inc.; Chp. 1, 2, 6, 13, and 14; 1991–92.

Dictionary of Computers, Information Processing & Telecommunications; Rosenberg; pp. 176, 339; 1987.

*Primary Examiner*—Almis R. Jankus
*Assistant Examiner*—Mark Kresloff
*Attorney, Agent, or Firm*—Kenyon & Kenyon

[57] ABSTRACT

A mathematical document editor that can perform live symbolic calculations. The mathematical document editor is capable of placing mathematical expressions at any position on a computer screen, that represents a printed document. A symbolic dependency graph is maintained such that it always reflects the mathematical dependencies on the computer screen. Any expression which includes a symbolic evaluation operator is evaluated by a symbolic algebra engine, taking into account all the definitions and constraints upon which the expression depends. If an expression is modified, introduced or deleted, the symbolic dependency graph is used to determine which expression containing the symbolic evaluation operator need to be modified. The present invention ensures that the document is 'up to date' in the sense that all expressions, including those requiring symbolic calculations, are consistent with all antecedent expressions upon which they depend.

15 Claims, 7 Drawing Sheets

File Edit Text Math Graphics Symbolic Window Books Help y := 3    x := 3
y := 2    m := 1..10 expand (x + 1)(x − 1) ⟶ 8    ⟵ substitutes the value of 3 for x before evaluating this expression.

expand (y + 1)(y − 1) ⟶ $y^2 - 1$    ⟵ Since y is defined twice. evaluates this expression symbolically.

assume x expand (x + 1)(x − 1) ⟶ $x^2 - 1$    ⟵ Although x is defined to be 3. ignores the definition because of the keyword "assume" followed by "x"

m ⟶ m    ⟵ Since m is defined as a range variable. ignores the definition.

assume α > 0, x $x \int_0^\infty e^{-\alpha t} dt \longrightarrow \dfrac{x}{\alpha}$    ⟵ Since α is constrained to be positive, integral converges. Since x follows "assume" the definition for x above is ignored.

Page 1                                                                    calc F9

File Edit Text Math Graphics Symbolic Window Books Help $f(x) := \sin(x)$      ←— Changing this definition changes both....

$g(t) := \int_0^1 f(t \cdot x) \, dx \quad \dfrac{-\cos(t)}{t} + \dfrac{1}{t}$ ...the symbolic evaluation and...

...the numerical evaluation...

$g(\pi) = 0.637$ $x := 3 \quad\quad y := 1$      ←— Changing these definitions updates only the last result.

assume $x, y$ expand $b := (x+y)^3 \longrightarrow b := x^3 + 3 \cdot x^2 \cdot y + 3 \cdot x \cdot y^2 + y^3$ $b = 64$

FIG. 8

METHOD FOR LIVE SYMBOLIC CALCULATIONS IN A MATHEMATICAL DOCUMENT EDITOR

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

1. Field of Invention

The present invention is directed to a computer-based method and apparatus for performing symbolic calculations, and in particular, for performing symbolic calculations in real-time.

2. Background of the Invention

Present computer controlled systems allow users to enter equations, including symbolic equations, in documents on a computer system and to perform calculations using these equations. Specialized computer systems exist for performing mathematical and statistical calculations. In these systems, the document on which the equations are entered can be considered to be a white board. The equations are entered by a user on the white board (i.e., the open document displayed on the computer screen), using known graphical user interfaces, such as, for example, the user interface of Microsoft, Inc's Windows operating system. A user can enter equations in the form that the user would write such equations on the white board, using common mathematical notations, rather than in the form of equations in programing languages or spreadsheets.

A system illustrative of current computerized mathematical symbolic programs is the Mathcad system, version 3.1 for Windows, by MathSoft, Inc., of Cambridge, Mass.

Prior art computerized mathematical systems allow entry and editing of equations in documents displayed on a computer screen. These documents can be displayed, printed and saved as files in a computer memory. It is known in such systems to automatically link and interpret related equations. The intelligent editor provided by current systems can understand and interpret equations as if a human mathematician, for example, by reading and interpreting a series of equations displayed on the screen from left to right and then top to bottom. The system links related equations. For example, if the user enters the equation $$x:=5 \tag{1}$$

on a document on a screen and then enters the equations $$y:=x-1 \tag{2}$$

$$2*y= \tag{3}$$

the system would automatically display the result for equation (3), i.e., "8", by determining that equation (3) needs the value of y, which is calculated at equation (2), which in turn needs the value of x, calculated at equation (1). Accordingly, the system understands the mathematical relationships between equations (1) to It is known in existing systems to provide "live" document capabilities. When a change is made to a variable in a live document, all related equations are also updated in real-time. For example, if the user edits equation (1) above, using graphical user interface techniques, so that equation (1) now reads $$x:=4 \tag{1}$$

then equations (2) and (3) are automatically recalculated in real-time, and an new result for equation (3) is automatically displayed in the document. A document that allows for real-time recalculation of related equations in a document is known as a live document. The module of existing systems that links related equations can be called an expression compiler.

It is noted for clarity that the equation reference numbers, e.g., "(1)" are not displayed in the live document and are included in this patent application for ease of reference to equations. In a live document, the computer system "knows" the relationship between related equations. A user reads the equations on a live document as the user would read equations written on a white board. When a user updates an equation, the user can, for example, place the cursor on the part of the equation that the user wishes to update, and add and delete variables, expressions and values in the equation. Live documents, and editing thereof, are explained in detail in the Mathcad 3.1 User's Guide Windows Version, published by Mathsoft, Inc. of Cambridge, Mass., and which is expressly incorporated herein.

Existing systems also include a symbolic algebra engine ("SAE"), also known as a symbolic processor. A SAE allows a user to undertake symbolic manipulation of equations. For example, if the user enters onto the live document the equation $$(x+1)^3 \tag{4}$$

and then actives the SAE, for example, by selecting the "evaluate symbolically" command from the "Symbolic" menu of commands, then the system will display immediately underneath the above equation the expanded equation $$x^3+3x^2+3x+1 \tag{5}$$

Other symbolic calculations that can be performed on equations include solving an equation for a variable, integrating and equation, simplifying an equation, factoring an expression and the like. However, present systems do not perform "live" document functions on symbolic equations.

For example, in existing systems, equations are passed to the SAE as text, are processed by the SAE, and the results are returned for display on the document. If an equation on which a symbolic function has taken place is modified, then the result of the symbolic function performed on that equation is not modified. Thus, in the above example, if equation (4) is changed to read $$(x+1)^4 \tag{4}$$

then equation (5), the result of the expansion of equation (4), is not changed. A user must reactivate the SAE, and request that the SAE expand equation (4) again. the document will then display the expansion under equation (4). However, the previous expansion of equation (4), i.e., equation (5), will still be displayed in the document as shown above, unchanged.

Moreover, existing systems do not allow symbolic manipulation of equations where relevant and needed information to the symbolic manipulation is contained in other related equations. For example, suppose the user enters the equations $$n:=2 \tag{5}$$

$$(y^n - 1) \quad (6)$$

and then the user requests that the SAE factorize equation (6), the SAE of existing systems will not be able to do so—the SAE does not know that n was given a value in equation (5). Accordingly, existing systems do not allow the "live" document features to be used when performing symbolic manipulation of equations.

In existing systems, the SAE is separate from the editor that allows entry of equations and the expression compiler that creates linkages between related expressions. Accordingly, the SAEs of existing systems can merely take expressions out of the document in use (and accordingly, out of the context in which the expression is placed), perform the symbolic manipulation, and return the result to the document. There are no dynamic links between an expression and the result of the symbolic manipulation of the expression—when the subject expression is modified, the resultant symbolically manipulated expression is not automatically symbolically recalculated.

Accordingly, there is a need for computerized systems that can perform symbolic manipulations in realtime in a live document.

SUMMARY OF THE INVENTION

The present invention provides for real-time symbolic manipulation of equations and expressions in computerized mathematics document system.

A user can enter expressions and equations into a processor controlled by means of a computer program. The expressions and equations can be displayed on a computer screen, or other output device, as if the computer screen was a white board, and the expressions and equations can be manipulated using graphical user interface commands. By using a specially designated symbolic equal sign as part of an equation, the present invention can perform symbolic manipulation on the equations and expressions that have been entered by the user.

According to the present invention, when required by a user, equations are manipulated symbolically rather than numerically. Related equations are linked so that the symbolic relationship between expressions and variables in an equation can be taken into account in the symbolic manipulation of an equation. When an equation or expression is updated or modified by the user, all equations that include the specially designated symbolic equal sign, together with all related equations to which they are linked, are automatically re-calculated (i.e., symbolically manipulated again) in real-time.

Thus, the present invention provides for live symbolics in a computerized mathematical document system.

DETAILED DESCRIPTION

Figure 1:
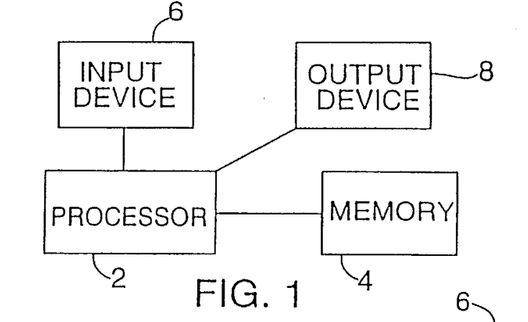
FIG. 1 is a block diagram on exemplary hardware for the present invention.

Turning now to the drawings, and initially FIG. 1, there is illustrated in block diagram form exemplary hardware that can be used in conjunction with the present invention. A processor 2, such as, for example, an IBM brand compatible personal computer with a 486 Intel chip. The processor 2 is coupled to a memory 4, such as a hard disk drive, that stores a computer program that is executed by the processor 2 to control and coordinate the method of the present invention. Data that is manipulated by the processor 2 can be stored in the memory 4. According to the present invention, the data is stored as a document. An input device 6, such as a keyboard and a mouse, are coupled to the processor 2 for receiving instructions and equations from a user. An output device 8, typically a computer monitor or CRT, is coupled to the processor 2 for displaying the document that the user is currently creating and editing.

Figure 2:
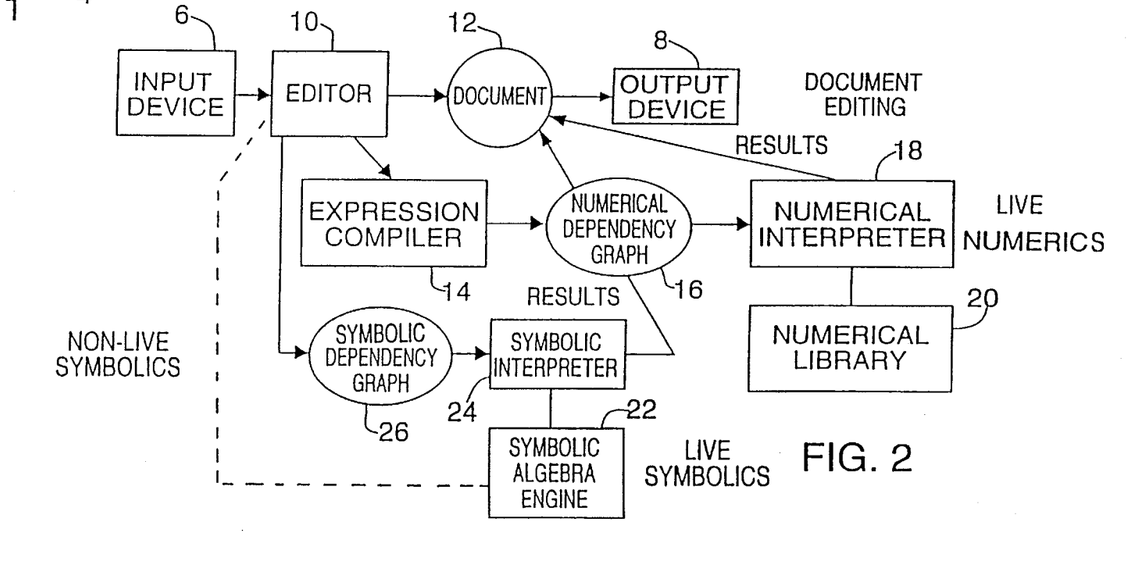
FIG. 2 is diagram of the structure of the modules of the present invention.

Turning now to FIG. 2, there is illustrated in block diagram form the main components of the present invention. A user enters an expression via the input device 6 to the smart editor 10 of the present invention. Assuming that the live symbolics feature of the present invention is not turned on, the following takes place. The editor 10 creates an expression based upon the user's input and places the expression in the open document 12. Typically, the expression is placed in the document 12 at the point identified by the user's cursor position. The document 12 is displayed to the user on an output device 8. (The instructions entered by the user to create and edit expressions are fully set forth in Mathcad 3.1 User's Guide Windows Version, published by Mathsoft, Inc. of Cambridge, Mass.

The expression entered by the user is sent by the editor 10 to an expression compiler 14. The expression compiler determines if this is a new expression or an update of an existing expression. If it is a new expression, the expression compiler 14 creates a new node in a numerical dependency graph 16. The numerical dependency graph 16 is a linked list data structure (coded in the "C" programming language) that stores all entered expressions and the relationship between expressions. The numerical dependency graph 16 can be thought of as a directed acyclic graph where the nodes represent expressions and the arcs represent variables that are numeric. For example, if the expression entered was "n:=2", then the expression compiler 14 calculates, in conjunction with a numerical computational engine 18, the value of the expression (in this case, "n=2"), and creates a node in the numerical dependency graph 16, where the node has the value 2, and the arc coming from the node as a value of "n". If the expression entered was "y:=2+3", then the value of y is calculated as 5 and substituted in the expression.

When the user enters a new expression, the expression compiler 14 looks up the numerical dependency graph 16 for other expressions that may give numerical values to variables or expressions used in the new expression. If so, the expression compiler 14 imports, into the new expression, that value from the corresponding node(s) in the graph 16 and calculates (as best as possible) the value for the new expression. Where the newly entered expression relies on values from other expressions, the expression compiler 14 generates a node for the new expression that depends from the nodes representing the expressions relied upon. When the user edits (or modifies) an expression that has been previously entered, the editor 10 modifies the expression and places the modified expression in the correct location in the document 12. The expression compiler 14 generates a new value of the modified expression. Next, the expression compiler 14 automatically goes down the linked list that represents the numerical dependency graph and marks as "out of date" all expressions that depend on the modified expression. Next, each node that has been marked out of date in turn recalculates itself (with the assistance of the numerical computational engine 18). In performing each recalculation, the node looks up the graph 16 to find the new values of an recalculated nodes (i.e., expressions). When a node is recalculated, the editor automatically updates the document 12. Accordingly, the document 12 is always the most current representation of the nodes of the numerical dependency graph 16. The numerical computational engine 18 has access to a numerical library 20 that is a library of subroutines for performing numerical computations.

In further detail, when an expression is entered by a user that requires calculation, the expression compiler 14 generates a "program" that determines how the expression is to be calculated to give a result. Where variables in the expression have been previously calculated, reference is made to these expressions. The numerical computational engine 18 executes such programs to evaluate expressions. If the user enters an equal sign (i.e. "=") after an expression, then the expression compiler generates a display "function" that specifies that the result of the expression is to be displayed alongside the expression on the document 12. These programs and functions can be stored in the link list of the numerical dependency graph 16. When an expression is modified, the expression compiler 14 will re-generate a new program for that expression, have the numerical computational engine 18 recalculate the result of the expression, and mark and have updated all expressions that reference the modified expression. For expressions that are updated because they depend upon changed expressions in the graph 16, a new program expressing the expression is generated. Thus, to be precise, it is programs representing expressions (not expressions) that are generated, re-generated and executed.

Accordingly, the document of the present invention can be regarded as a "live document".

In the representative embodiment of the present invention, the editor 10, expression compiler 14, numerical dependency graph 16 and numerical computational engine 18 are implemented in the "C" programming language.

Coupled to the editor 10 of the present invention, and operating independently from the expression compiler 14, is a symbolic algebra engine ("SAE") 22. In the representative embodiment of the present invention, the SAE is a version of the Maple symbolic engine developed by Waterloo Maple Software, Inc. of Ontario, Canada. The user can mark an expression in the document 12, for example, by placing the cursor on the expression and clicking a button on the mouse 6. The user can then turn on the SAE, and enter a symbolic command. Examples of symbolic commands include EVALUATE SYMBOLICALLY, SIMPLIFY, EXPAND EXPRESSION, FACTOR EXPRESSION, SOLVE FOR VARIABLE, INTEGRATE ON VARIABLE, DIFFERENTIATE ON VARIABLE, CONVERT TO PARTIAL FRACTION, TRANSPOSE MATRIX, INVERT MATRIX, DETERMINATE OF MATRIX. The editor 10 takes the expression selected by the user, passes it to the SAE 22, which performs the requested symbolic command. The result is returned to the editor 10 for insertion into the document 12. However, because the SAE 22 is independent from the expression compiler for the reason that the expression compiler 14 can only handle numerical (not symbolic) expressions, the SAE 22 cannot perform live symbolic functions. An expression returned to editor 10 by the SAE 22 and inserted in the document 12 is not automatically updated when the expression that was selected by the user and was passed to the SAE 22 is later modified.

The live symbolics feature of the present invention in implemented by means of a symbolic dependency graph ("SDG") 26 and a live symbolic interpreter 24. The user must activate the live symbolics feature of the present invention by entering a command to do so. Once the live symbolics feature is activated, each expression that is entered by the user is passed by the editor 10 to both the expression compiler 14 (for numerical calculations) and to the SDG 26 (for symbolic processing).

Conceptually, each time a new expression is entered, a node is created in the SDG 26. This node represents the expression, as an expression. No calculation step takes place, and there is no substitution of values for variables. Each expression is treated as an symbolic expression, not a numerical expression. Where dependencies exist between expressions, this is reflected in the structure of the SDG 26.

When requested by the user, the live symbolic interpreter 24 will take an expression nominated by the user and perform a symbolic command specified by the user. The symbolic command is specified by the user in the representative embodiment by placing a designated symbolic equals sign (e.g., $\rightarrow$) after an expression that the user wishes to have symbolically processed. It is at this stage that the live symbolic interpreter 24 analyzes the meaning of each expression, substitutes values, variable, and other expressions in dependent expressions (as specified by the SDG 26). This step can be regarded as assembling definitions for the variables and expressions in the selected expression. The live symbolic interpreter 24 will then take the selected expression and pass the selected expression to the SAE 22 for processing. The resultant expression is returned via the live symbolic interpreter 24 to the SDG 26, which is updated by adding the returned expression to the SDG 26. The returned expression is then forwarded to the editor 10 so that the document can be updated by including the returned expression.

Because the expression that is the result of the symbolic interpretation is inserted in the SDG 26, each time an expression in the SDG 26 ms modified or updated, the live symbolic interpreter 24 determines if any expression that relies upon the modified/updated expression is affected, and if so, passes the expression to the SAE 22 for processing as above.

In contrast to the numerical dependency graph 16, where the nodes represent programs that calculate numerical values for entered expressions and where the arcs are variable names that represent the corresponding numerical variables, the nodes of the SDG 26 represent expressions qua expressions and the arcs represent variable names that represent the corresponding expressions. For example, if the user enters the following expressions:

$$x:=5;$$

$$y:=x-1;$$

and then entered the expression $$(x+1).y=$$

Figure 3A:
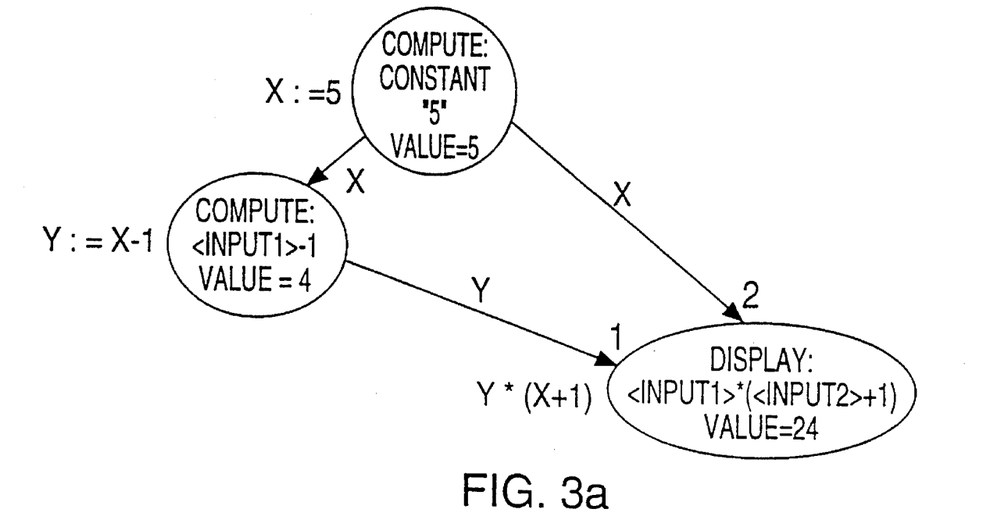
FIGS. 3a and 3b are representations of data structures of the present invention.

(the "=" sign in the representative embodiment of the present invention signifying that this is to be evaluated as a numerical expression,) then the numerical dependency graph 16 of FIG. 3a would be produced. The result 24 would be displayed However, if the user instead entered the expression $$(x+1).y\rightarrow$$

Figure 3B:
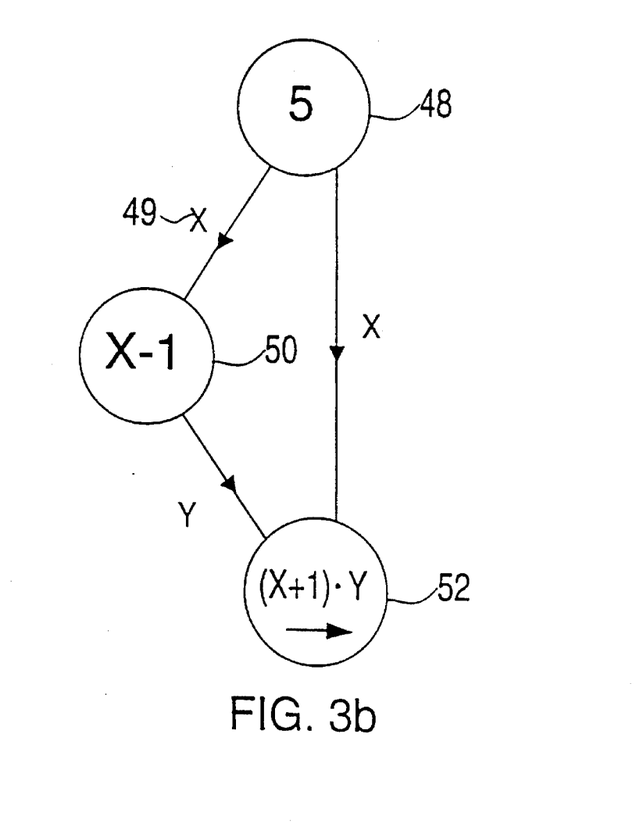

(the "$\rightarrow$" sign signifying that the expression is to be evaluated symbolically), then the SDG 26 of FIG. 3b would also be produced. It is noted that it is not the order that the expressions are entered by the user that determines the hierarchy of graphs, but rather, the mathematical meaning as to where the expressions are placed in the document. In FIG. 3b, if the node representing the expression (y:=x−1) is edited by the user to read (y:=x−2), node 50 would change, but would not look up the graph and regenerate unless requested to do so by node 52. It is further noted that the arcs in FIG. 3b pass expressions, not numerical results. Accordingly, arc 49 passes the expression "5", not the numerical value 5. In contrast, if the same modification was made to the graph of FIG. 3a, then the expression therein would be immediately numerically recalculated.

In the representative embodiment of the present invention, the SDG 26 and the live symbolic interpreter 24 are implemented using the expert system shell known as CLIPS (C Language Integrated Production Systems), developed by NASA's artificial intelligence section. CLIPS acts like a separate and independent processor. The live symbolic interpreter 24 is implemented as a set of expert system rules according to CLIPS notation. These rules are set forth in Appendix A attached hereto and are expressly incorporated herein by reference. The expressions of the SDG 26 are facts (or tokens) that can be processed by the rules of the live symbolic interpreter 24. An example of a fact may be (NODE AT 527 607234)

(607234 defs "x")

which states that the node for expression "x" is at line 527, having a generated identification number of 607234. This notion is easily understood by those familiar with the CLIPS notation. CLIPS is a public domain program.

Accordingly, when an expression is entered by the user, the editor 10 places the expression in the SDG 22 in the form of a complex CLIPS fact. The editor 10 includes code programmed in the C programming language to perform this function. If the expression includes a "→" sign, the live symbolic interpreter 24 causes a symbolic evaluation of the expression to be performed. In doing so, the live symbolic interpreter 24 examines the SDG 22 to determine on what expressions the subject expression depends. For example, if the subject expression is "x=y→", then the live symbolic interpreter 24 determines, by examining the SDG 22, what are the symbolic values of "x" and of "y". The live symbolic interpreter 24 takes the symbolic definitions of x and y and the subject expression, a passes them to the SAE for evaluation. The resultant expression is displayed as an expression.

Of course, the dependencies of expressions can be very complex, and the general principals discussed above are able to take into account the complexity of the mathematics.

Figure 4:
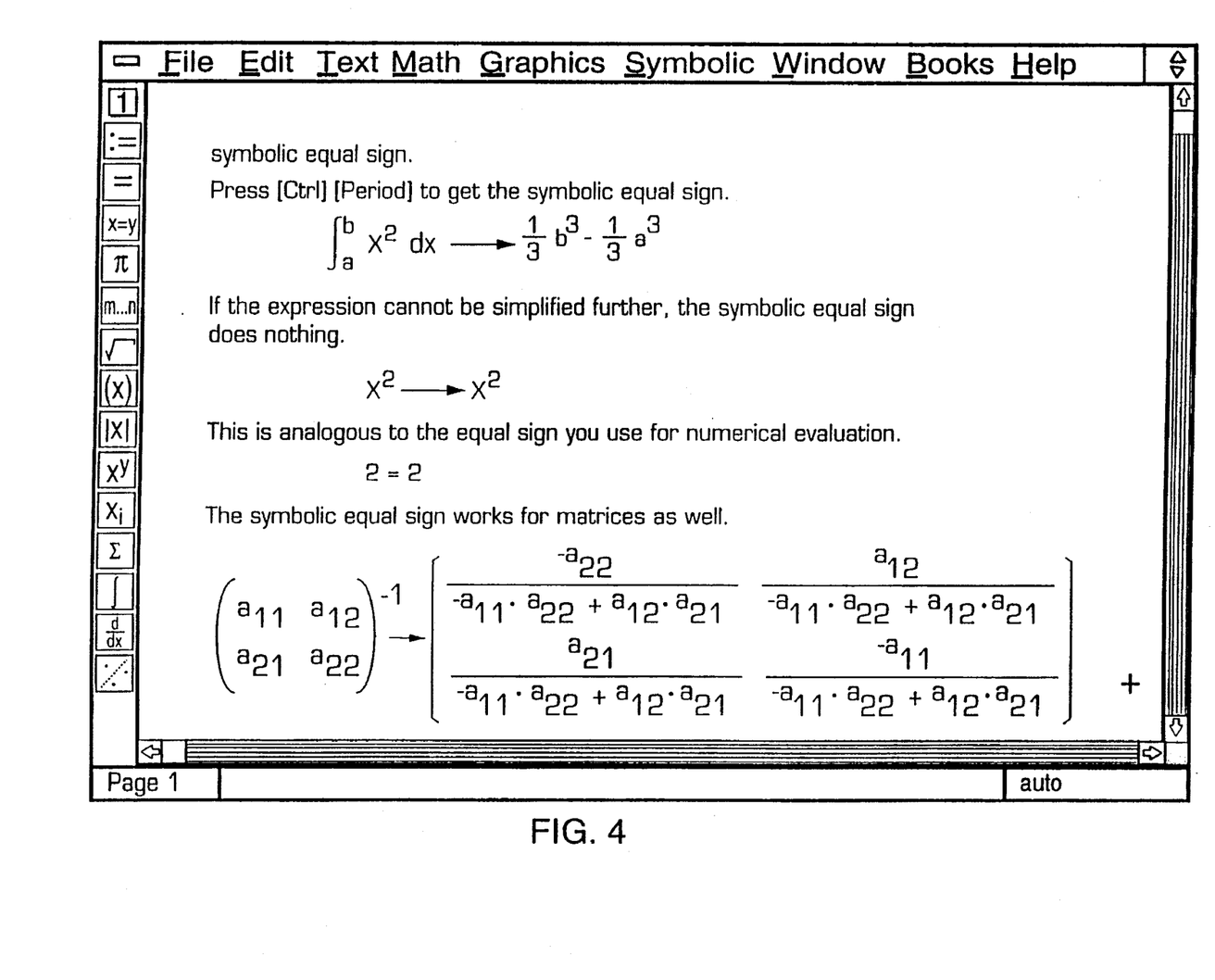
FIGS. 4 to 8 are example screen displays produced by the present invention.

Turning now to FIG. 4, there is illustrated at screen display of an example document 12 generated by the present invention. Because the document 12 is to represent a white board, both expressions and text can be included in the document. Parts of the document that comprise expressions are known as "math regions." Here, the text is included for explanatory purposes. FIG.4 shows examples of how a user may use the "→" symbolic operator of the present invention, which, in the representative embodiment, is entered by the user by pressing the "control" key and the "period" key. The "→" operator applies to the whole of the expression of its left hand side, and the result of the symbolic manipulation is on the right hand side.

Figure 5:
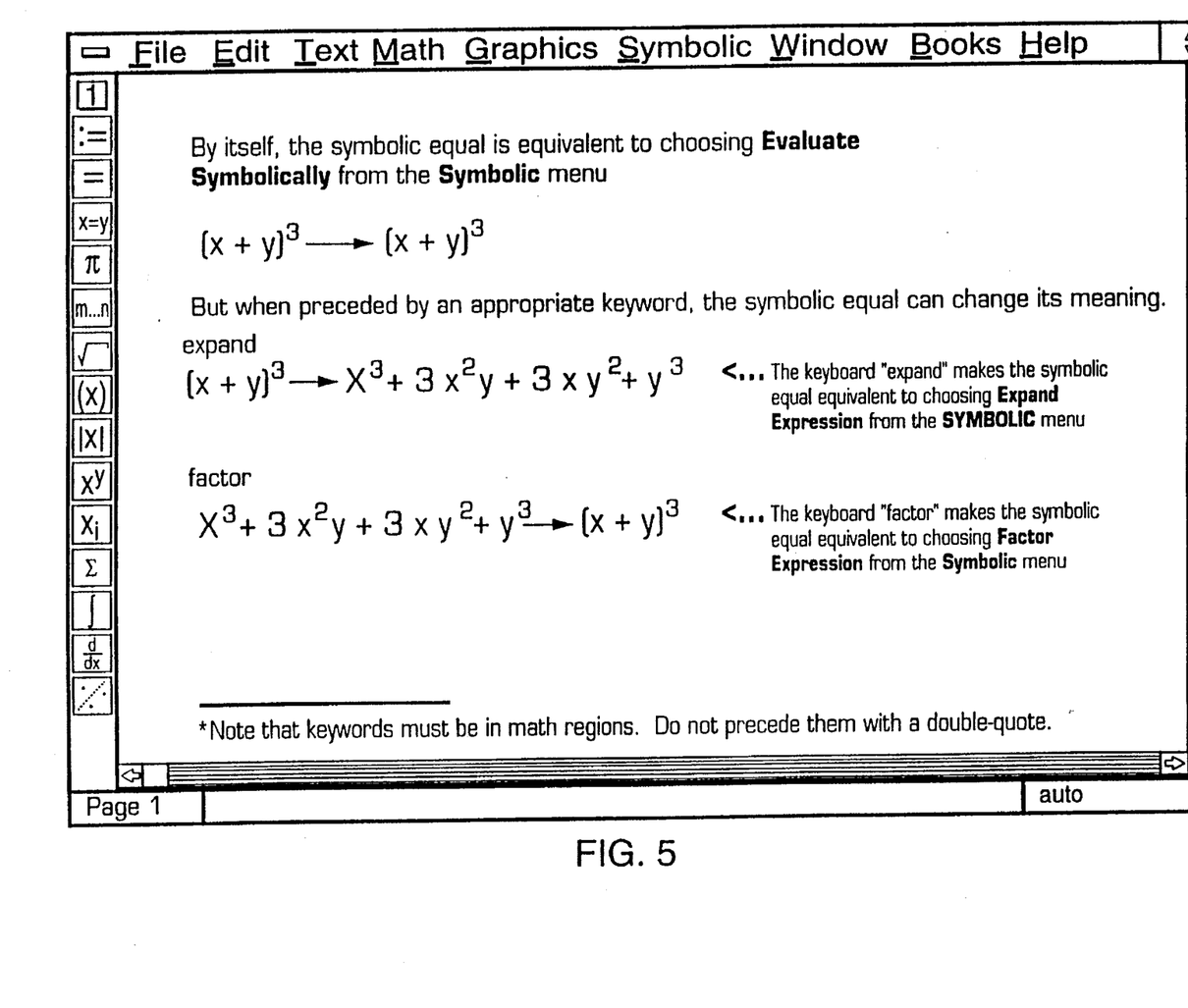

FIG. 5 is another example, showing the use of keywords. Keywords modify the operation of the "→" operator. In the representative embodiment, there are five keywords. The keyword "simplify" simplifies the expression, performing arithmetic, canceling common factors and using basic trigonometric and inverse function identifiers. The keyword "expand" expands all powers and products of sums in the selected expression. The keyword "factor" factors the selected expression into a product, if the entire expression can be written as a product. The keyword "assume" causes the present invention to treat the variable which follows as a variable even though it may have numerical values assigned to it. It can also be used to specify constraints to be used in evaluation of the expression. The keyword "complex" causes the present invention to carry out symbolic evaluation in the complex domain. The result will usually be in the form a+i.b.

Figure 6:
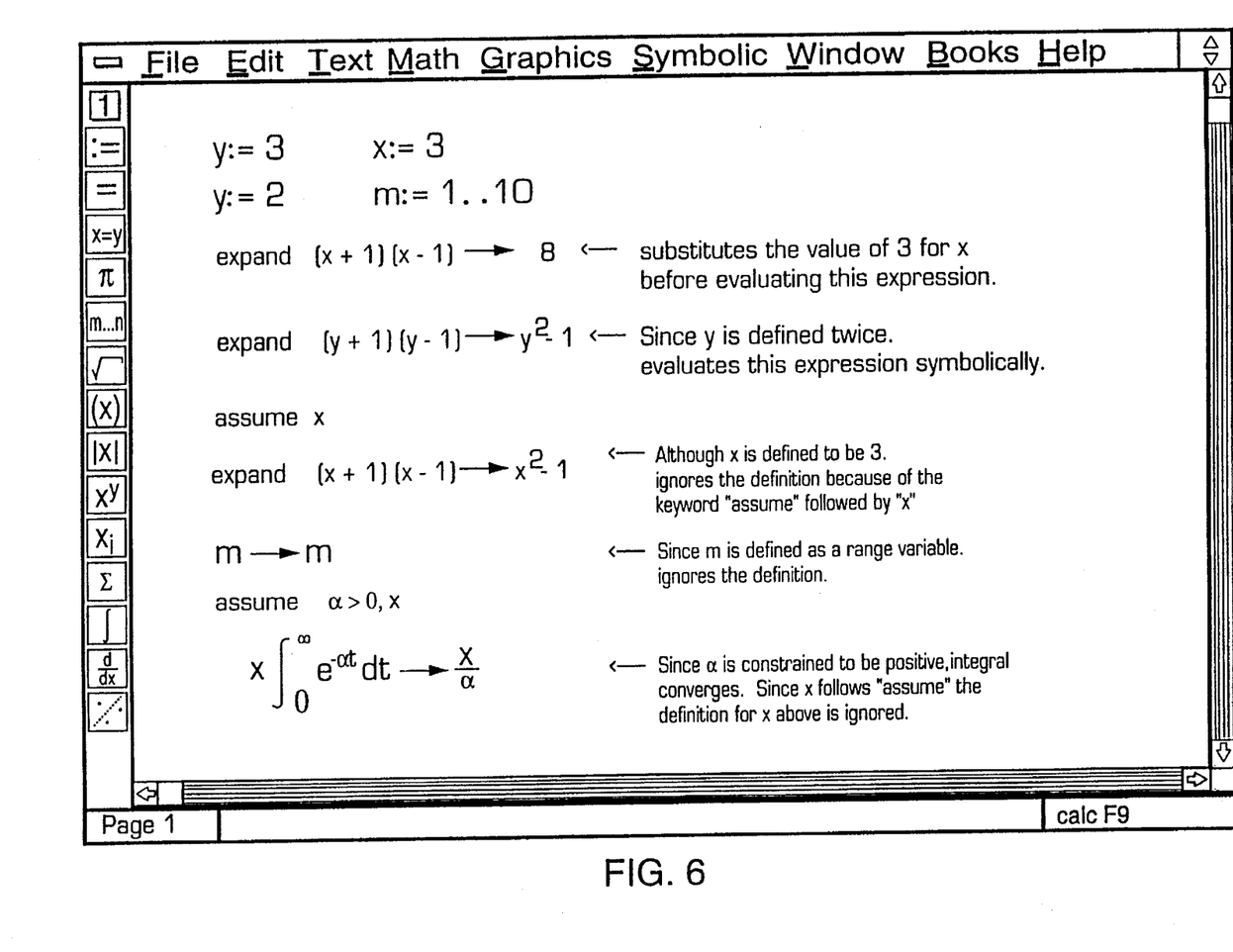
Figure 7:
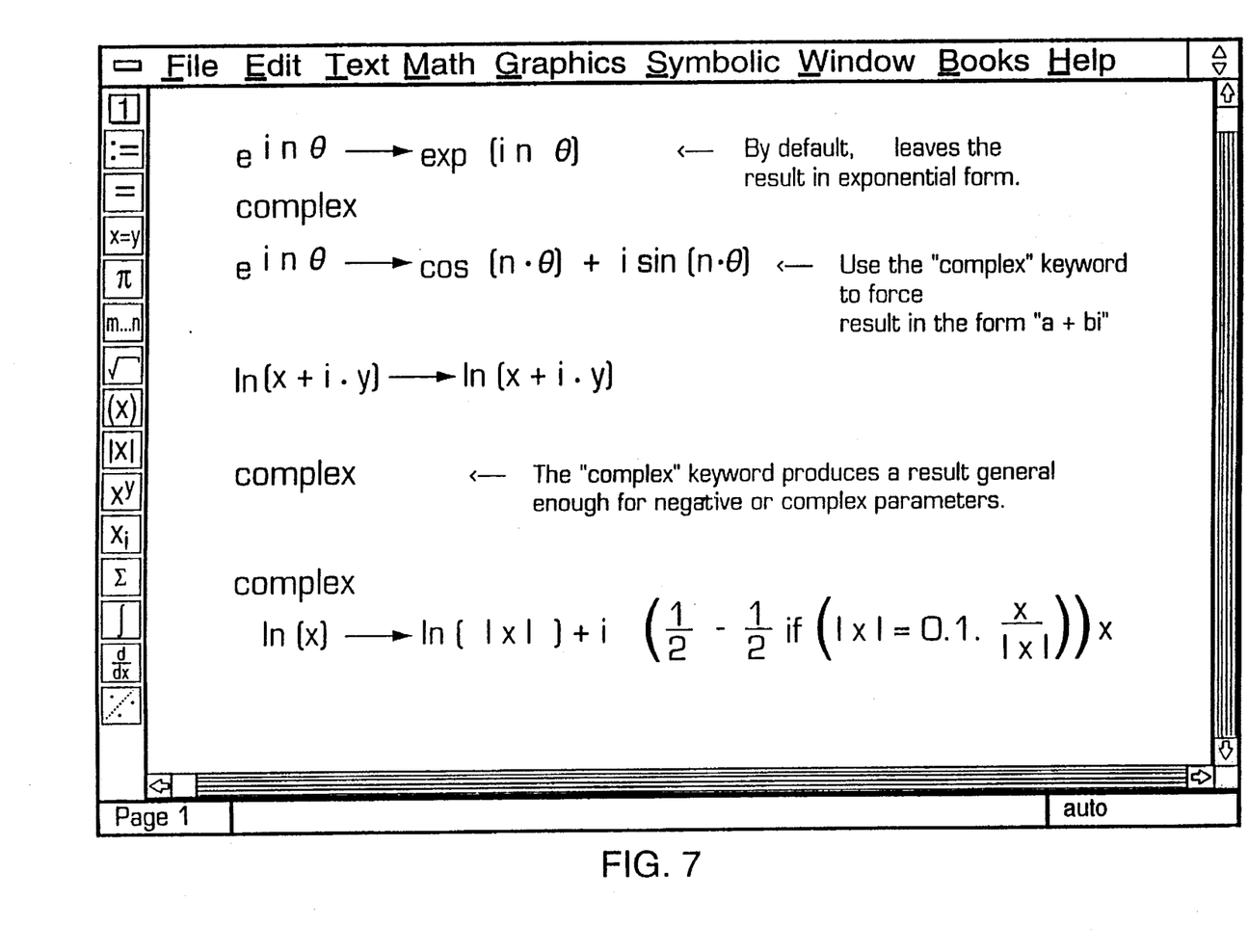

It is noted that in the representative embodiment that keywords can be entered directly on a document, as if writing on a white board, or can be selected from a "Symbolic" menu on the menu bar of the graphical user interface of the present invention. FIG. 6 shows use of the "Assume" keyword. FIG. 7 shows use of the "complex" keyword.

Figure 8:
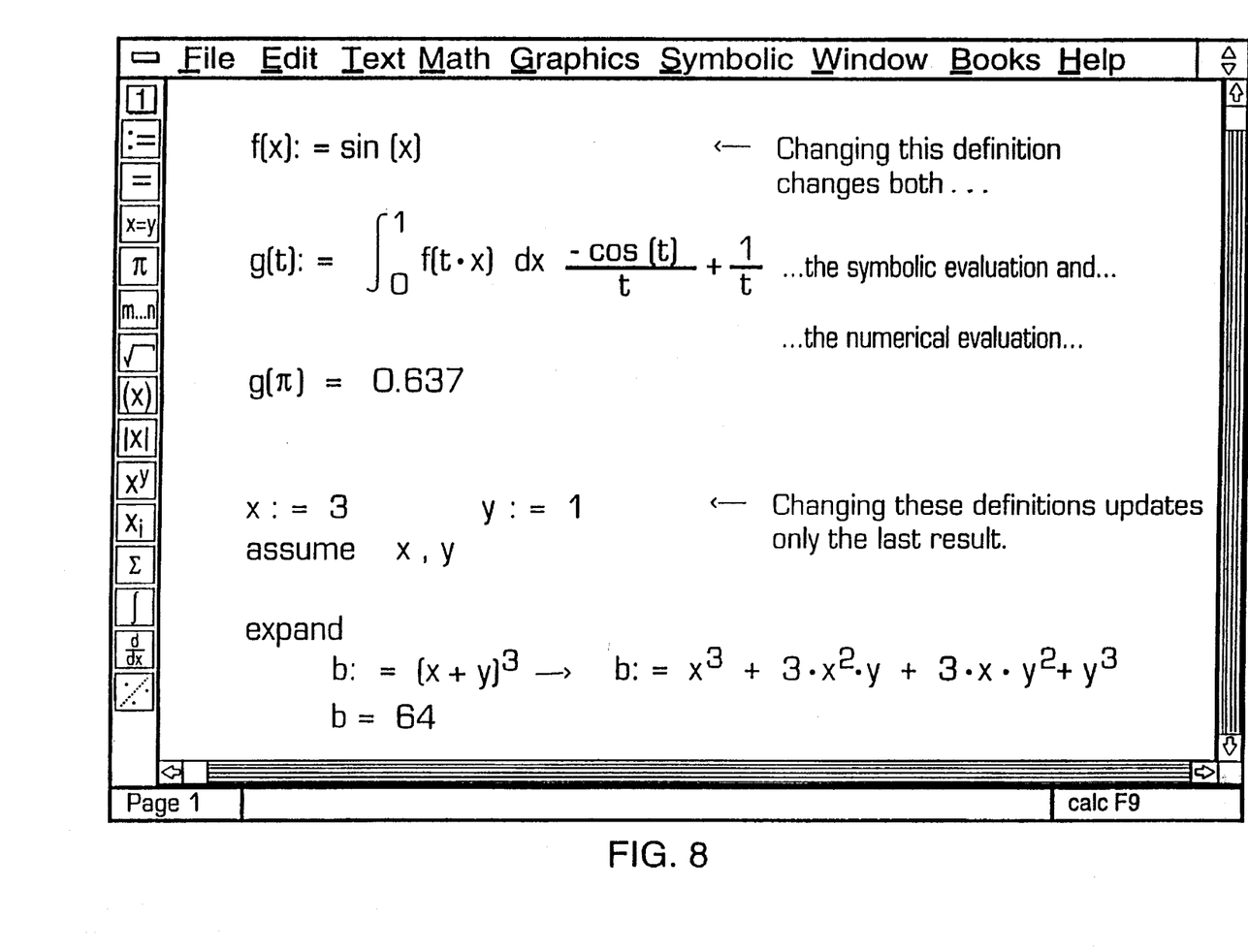

FIG. 8 illustrates creating expressions that depend upon a symbolic result. By using the symbolic equals sign in definitions, the user can create other definitions that depend on a symbolic result. The additional definitions will change whenever the symbolic result changes. Thus, the changing of a function definition changes the result of all expressions that use that function.

What is claimed is:

1. A computer-based method for performing live symbolic mathematical operations in a mathematical document editor, said mathematical document editor capable of editing and processing a mathematical document and controlled by a computer having a screen capable of displaying the mathematical document, the method comprising the steps of:

placing mathematical expressions in standard mathematical form at any position on the mathematical document, a subset of the mathematical expressions comprising a symbolic evaluation operator;

maintaining a dependency graph so that the dependency graph continuously represents mathematical dependencies between the mathematical expressions in the mathematical document;

symbolically evaluating each mathematical expression in the mathematical document that includes the symbolic evaluation operator, said step of symbolically evaluating including performing, for each mathematical expression that includes the symbolic evaluation operator, the substeps of (i) utilizing the dependency graph to ascertain all mathematical expressions on which the mathematical expression that includes the symbolic evaluation operator directly and indirectly depend, and (ii) passing the mathematical expression that includes the symbolic evaluation operator and the mathematical expressions ascertained at substep (i) to a symbolic algebra engine for symbolic evaluation;

displaying in the mathematical document results of the symbolic evaluation of each mathematical expression evaluated at the previous step;

editing a mathematical expression in the mathematical document; and automatically updating the mathematical document whenever a mathematical expression is edited by utilizing the dependency graph to take into account all mathematical dependencies in the mathematical document so that all mathematical expressions comprising the symbolic evaluation operator are consistent with all antecedent mathematical expressions upon which said mathematical expressions comprising the symbolic evaluation operator depend, said step of automatically updating including the substeps of (a) utilizing the dependency graph to ascertain if a mathematical expression that includes the symbolic evaluation operator depends upon the edited mathematical expression, (b) utilizing the dependency graph to determine all mathematical expressions on which the mathematical expression that includes the symbolic evaluation operator ascertained at substep (a) depends, and (c) passing the edited mathematical expression, the mathematical expression that includes the symbolic evaluation operator ascertained at substep (a) and the mathematical expressions determined at substep (b) to the symbolic algebra engine for symbolic evaluation.

2. The method of claim 1 wherein the step of editing a mathematical expression in the mathematical document comprises the step of modifying a mathematical expression in the mathematical document.

3. The method of claim 1 wherein the step of editing a mathematical expression in the mathematical document comprises the step of deleting a mathematical expression in the mathematical document.

4. The method of claim 1 wherein the step of editing a mathematical expression in the mathematical document comprises the step of adding a mathematical expression to the mathematical document.

5. The method of claim 4 further comprising the step of adding a node to the directed acyclic graph each time an expression is added to the mathematical document.

6. The method of claim 1 wherein the mathematical expressions include mathematical constraints.

7. The method of claim 1 wherein the mathematical expressions include mathematical definitions.

8. The method of claim 1 wherein the dependency graph is a directed acyclic graph.

9. The method of claim 8 wherein the directed acyclic graph comprises a plurality of nodes, each node representing one expression in the mathematical document.

10. The method of claim 9 wherein the directed acyclic graph comprises arcs linking the plurality of nodes, each arc representing a variable name.

11. The method of claim 1 wherein the step of editing a mathematical expression in the mathematical document comprises the step of moving a mathematical expression in the mathematical document.

12. A computer-based method for performing live symbolic mathematical operations in a mathematical document editor, said mathematical document editor capable of editing and processing a mathematical document and controlled by a computer having a screen capable of displaying the mathematical document, the method comprising the steps of:

providing a symbolic evaluation operator signifying that a mathematical expression is to be evaluated symbolically;

enabling a user to place mathematical expressions in standard mathematical form at any position on the mathematical document, a subset of the mathematical expressions comprising the symbolic evaluation operator;

maintaining a dependency graph so that the dependency graph continuously represents mathematical dependencies between the mathematical expressions in the mathematical document, the dependency graph including a plurality of nodes, each node representing in symbolic form an expression in the mathematical document;

symbolically evaluating each mathematical expression in the mathematical document that includes the symbolic evaluation operator;

displaying in the mathematical document results of the symbolic evaluation of each mathematical expression evaluated at the previous step;

enabling the user to edit one or more mathematical expressions in the mathematical document;

automatically updating the mathematical document whenever a mathematical expression is edited by the user, said automatically updating step including the substeps of:

(a) automatically updating the dependency graph to include the edited one or more mathematical expressions, (b) utilizing the dependency graph to determine all mathematical expressions with the symbolic evaluation operator that depend upon the edited one or more mathematical expressions, (c) utilizing the dependency graph to determine all mathematical expressions on which the mathematical expressions with the symbolic evaluation operator determined at substep (b) depend, and (d) passing to the symbolic algebra engine for symbolic evaluation the edited one or more mathematical expressions the mathematical expressions with the symbolic evaluation operator determined at substep (b) and the mathematical expressions determined at substep (c); and redisplaying mathematical document as automatically updated in the previous step.

13. The method of claim 12 wherein the step of editing one or more mathematical expressions in the mathematical document comprises the step of modifying a mathematical expression in the mathematical document.

14. The method of claim 13 wherein the step of editing one or more mathematical expressions in the mathematical document comprises the step of deleting a mathematical expression in the mathematical document.

15. The method of claim 14 wherein the step of editing one or more mathematical expressions in the mathematical document comprises the step of adding a mathematical expression to the mathematical document.

* * * * *